United States Patent [19]

Matsuyama

[11] Patent Number: 4,611,898
[45] Date of Patent: Sep. 16, 1986

[54] VOLTAGE DETECTING DEVICE

[75] Inventor: Shinichi Matsuyama, Kanagawa, Japan

[73] Assignee: Canon Kabushiki Kaisha, Tokyo, Japan

[21] Appl. No.: 701,125

[22] Filed: Feb. 13, 1985

[30] Foreign Application Priority Data

Feb. 13, 1984 [JP] Japan ................................. 59-24683

[51] Int. Cl.⁴ ............................................. G03B 7/26
[52] U.S. Cl. .................................. 354/484; 354/234.1
[58] Field of Search ..................... 354/468, 484, 258.1, 354/266, 267.1, 268, 271.1, 234.1, 235.1

[56] References Cited

U.S. PATENT DOCUMENTS

| | | | |
|---|---|---|---|
| 4,126,873 | 11/1978 | Urano et al. | 354/468 X |
| 4,190,344 | 2/1980 | Ishiguro et al. | 354/268 X |
| 4,310,230 | 1/1982 | Mootoori | 354/468 |
| 4,502,774 | 3/1985 | Suzuki et al. | 354/468 X |

Primary Examiner—Russell E. Adams
Attorney, Agent, or Firm—Toren, McGeady, Stanger, Goldberg & Kiel

[57] ABSTRACT

A voltage detecting device for a camera for detecting whether or not the voltage of a power source has a prescribed value or a value higher than the prescribed value. A device which makes intermittent voltage detections after the leader screen of a shutter starts running and terminates the voltage detecting action as the follower screen of the shutter runs.

22 Claims, 2 Drawing Figures

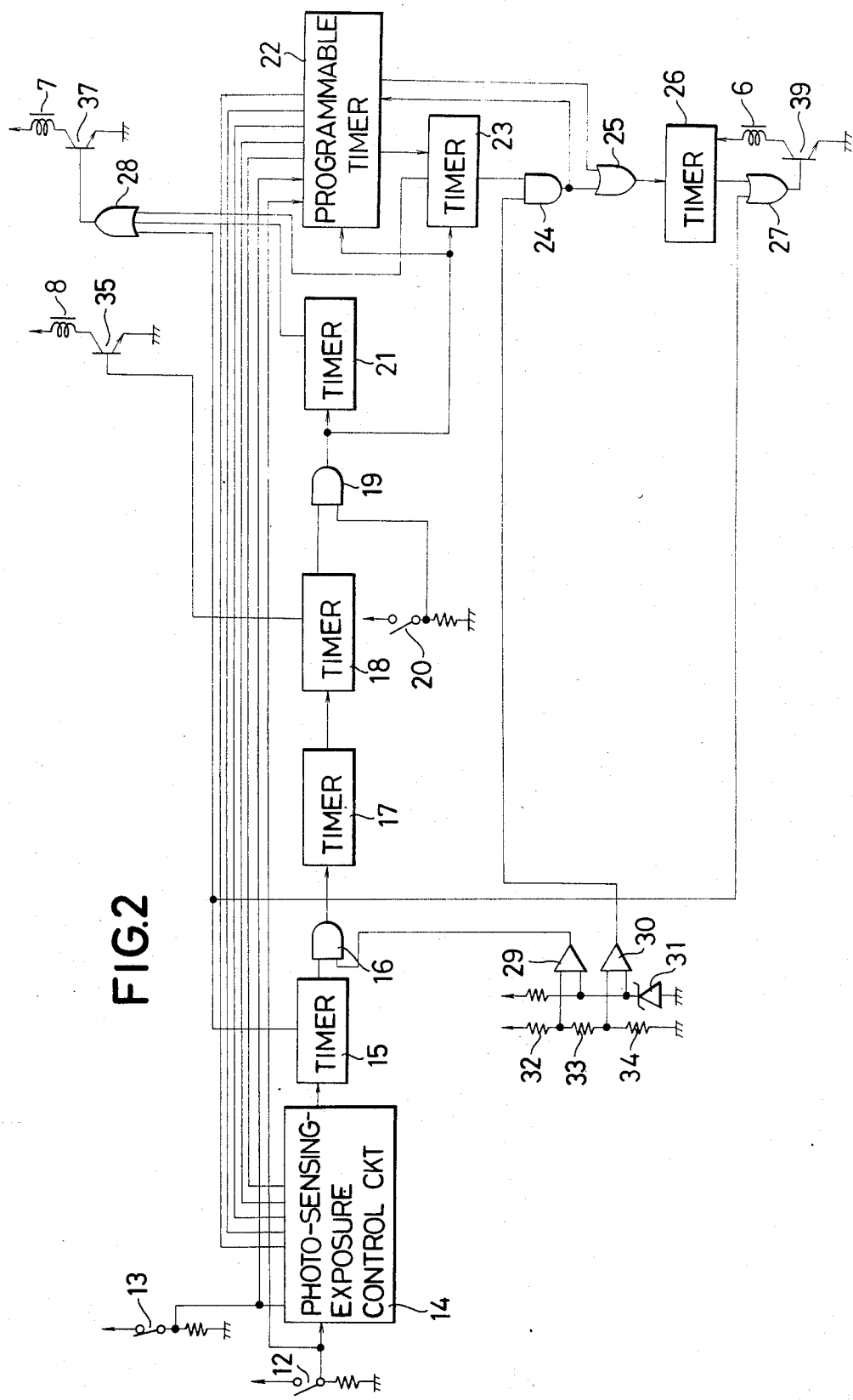

VOLTAGE DETECTING DEVICE

BACKGROUND OF THE INVENTION

1. Field of the Invention

The present invention relates to a voltage detecting device for a camera.

2. Description of the Prior Art

Conventional voltage detecting devices for a camera have power supplied to an electromagnetic member which controls the start of the running of a leader screen and a follower screen of a shutter curtain or, to an electric load which is equivalent to the electromagnetic member just before a release operation, in order to detect the power source voltage so that it can be judged as to whether or not a normal release operation is possible. When it is judged that a release operation is not possible, by detection of the power source voltage, the release operation is inhibited, thus preventing the problem of the shutter curtain being left open.

However, in the case of a long time release or a bulb release, it takes a long period of time from the moment that the power source voltage is detected (just before the release operation), until the moment when the power is actually supplied to the electromagnetic member for controlling the start of the running of the follower screen. Therefore it is difficult to judge, from the value of the power source voltage detected before the release, whether or not the running of the follower screen is possible. That is, especially at the time of a bulb release, the photographer is to determine at will, the length of time from the running of the leader screen until the running of the follower screen. However, sometimes the shutter is left open for as long as half a day. Thus it is very difficult to judge from detection of the voltage before the release, at what level of the power source voltage the release operation becomes impossible. Therefore, it becomes necessary to set the reference voltage at a considerably high level in order to judge whether or not the release operation is possible (guaranteed) by the power source voltage before the release, which then generates the problem of the battery life becoming short. Also, in this kind of system, for a bulb release in which the release time can be set at any desired length of time, a voltage level which can guarantee the running of the follower screen for that chosen length of time, in principle, cannot be set. Also, even if the voltage level is set at a considerably high level, the problem of the shutter being left opened as a result of the follower screen being unable to run, cannot be solved.

Also, heretofore, there has been a system in which control of the running of the leader screen is done by supplying power to an electromagnetic member for the leader screen, while contrary thereto, control of the running of the follower screen is accomplished, by the release of the power supply to an electromagnetic member for the follower screen. It has been proposed that in this system, the state in which power is supplied to the electomagnetic member, for control of the running of the follower screen when the shutter is opened after the running of the leader screen, is utilized for detecting the power source voltage at the time when power is supplied thereto. However, a basic problem in such a system is that since the follower screen is retained by supplying power to the electromagnetic member, power consumption will be great as in the case of a long time release or a bulb release, thus the life of the battery is shortened considerably.

An object of the present invention is to provide a voltage detecting device for a camera in which an exact judgement can be made as to whether or not a release operation is possible in spite of any shutter time length that is chosen by the photographer, and at the same time the life of the battery can be extended.

Other objects of the present invention shall be clarified by the following detailed explanations thereof.

SUMMARY OF THE INVENTION

A voltage detecting device for a camera including shutter control means for controlling at least the start of the running of a follower screen of a shutter by control of the power supply to an electromagnetic member; a voltage detecting circuit for detecting the voltage level of a power source voltage; and an operating means for intermittently detecting the voltage by means of the voltage detecting circuit during a period of time from the start of the running of a leader screen of the shutter until the start of the running of the follower screen.

BRIEF DESCRIPTION OF THE DRAWINGS

FIG. 2 is an electric circuit diagram for an embodiment of the present invention.

DETAILED DESCRIPTION OF THE PREFERRED EMBODIMENT

Figure 1:
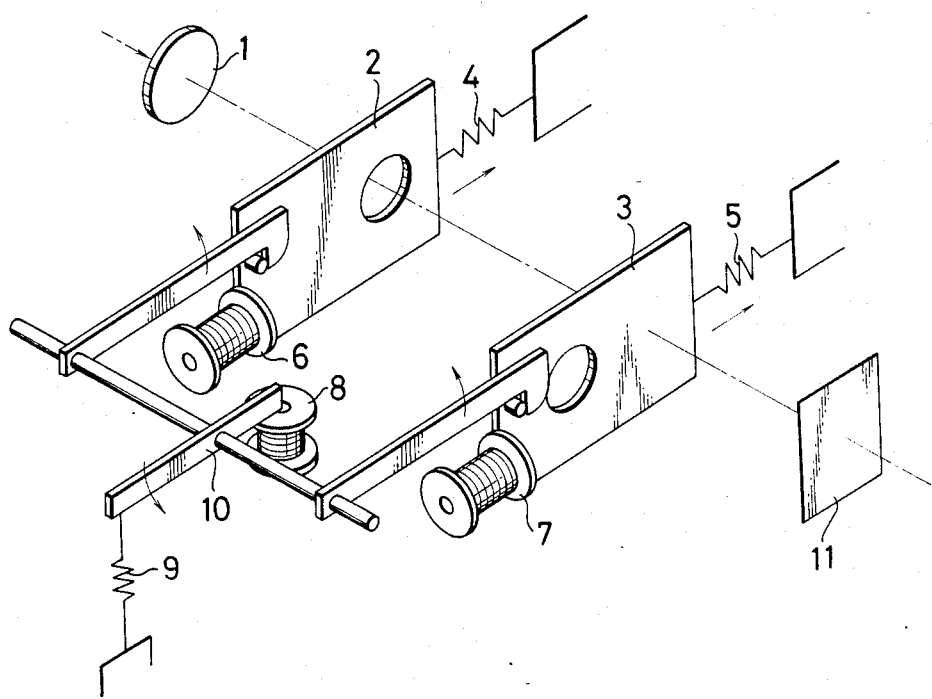
FIG. 1 is an oblique view showing the principle of a shutter mechanism in an embodiment of the present invention.

The present invention shall now be explained in detail with reference to the drawings.

In FIG. 1 in which the principle of the shutter mechanism is shown, includes a taking lens 1, a follower screen 2 of the shutter, a leader screen 3 of the shutter, and 5 are springs for respectively pulling the follower screen 2 and the leader screen 3 and making the same run as they shrink. 6, 7 and 8 are electromagnets having permanent magnets which gain attracting power when power is not supplied thereto and lose attracting power when power is supplied thereto, wherein the electromagnet 6 starts the running of the follower screen, and 7 is an electromagnet for starting the running of the leader screen 3, the electromagnet 8 inhibits the running of a shutter curtain by a clamp member 10, a spring 9 disengages the clamp member 10 from the shutter curtain as it shrinks at a time when power is supplied to the electromagnet 8, and reference numeral 11 identifies a film plane of a camera.

In the electrical circuit diagram of FIG. 2, a release switch 12 is placed on the ON state as the shutter release button (not shown in the drawing) is pressed, a bulb switch 13 is in the OFF state when a bulb release is selected by a selection dial (not shown in the drawing), and is in the ON state at times other than during selection of the bulb release, and reference numeral 14 identifies a photosensing-exposure control circuit, wherein as the release switch 12 comes ON at the time the bulb switch 13 is ON (that is, not at the time of a bulb release), photo-sensing-computation is done, and a timer 15 is set corresponding to an appropriate shutter time at a programmable timer 22. A appropriate aperture value is also given to an aperture adjusting mechanism (not shown in the drawing), then the timer 15 starts counting at the time when the preparations have been completed. At a time when the bulb switch 13 is OFF (that is, the time of a bulb release) the release switch 12 comes ON and at the same time the timer 15 is made to start a time counting, however, a photo-sensing-exposure control will not be made.

The timer 15 is a timer for simultaneously supplying power for a voltage check to both the electromagnet 7 for starting the running of the leader screen 3 and the electromagnet 6 for starting the running of the follower screen 2, wherein the timer 15 starts counting at the moment a photosensing-exposure control of the photo-sensing-exposure control circuit 14 is completed and power is supplied for a predetermined length of time to the electromagnet 7 in order to start running the leader screen 3 and to the electromagnet 6 in order to start running the follower screen 2, giving "1" to an AND gate 16 from the moment just before the completion of the power supply until the completion thereof.

The AND gate 16 is for obtaining a timing to checking the voltage of power being supplied from the timer 15 and for introducing a power source voltage detecting state thereinto from a comparator 29, and then to have a timer 17 start counting in accordance with the result attained from checking the voltage of power being supplied. The timer 17 starts a time counting as a "1" (being in a release operation) which is produced from the AND gate 16, then after the lapse of a predetermined length of time, a timer 18 is made to start a time counting. The timer 18 is a timer which supplies power to the electromagnet 8 for a predetermined length of time, then gives a "1" to an AND gate 19, and the AND gate 19 is to have timers 21 to 23 start a time counting, based on the mirror-up state of a mirror-up switch 20 which comes ON when a quick return mirror (not shown in the drawing) is up, after a completion of the power supply from the timer 18 to the electromagnet 8. The timer 21 supplies power to the electromagnet 7 to start the running of the leader screen 3 for a predetermined length of time. The programmable timer 22 receives an output of "1" from the AND gate 19 until it reaches the time set by the photo-sensing-exposure control circuit 14, starts counting and then produces a "1" at an OR gate 25 at a time when time counting is completed. Also, when the bulb switch 13 is OFF, that is, at the time of a bulb release, a time counting is not done at all; and "1" is produced at the OR gate 25 as the release switch 12 comes ON. A timer 23 checks the voltage of power being supplied during a release and is to start counting at the same time the time counting of the programmable timer 22 starts and supply power to the electromagnet 7 in order to start the running of the leader screen 3 intermittently at each predetermined length of time, then thereafter produces "1" to an AND gate 24 from the moment just before completion of the power supply until the completion thereof. Therefore, at the time of a bulb release operation, the plurality of checks being made on the voltage of power being supplied will be done intermittently. The AND gate 24 is to receive a timing for checking the voltage of power being supplied from the timer 23, obtain a power source voltage state from the comparator 30, and then give an output to the OR gate 25, such that it corresponds to a state thereof, while at the same time it forcibly terminates the time counting of the programmable timer 22 when the voltage value is at the predetermined voltage or below. The OR gate 25 is to have the timer 25 start its time counting as a result of either a time counting completion of the programmable timer 22 or the checking of the voltage of power being supplied from the AND gate 24. The timer 26 is to supply power to the electromagnet 6 for a predetermined length of time in order to start the running of the follower screen 2. An OR gate 27 is to supply power to the electromagnet 6 by the timer 15 or the timer 26. An OR gate 28 supplies power to the electromagnet 7 for the purpose of starting the running of the leader screen 3 by the timer 15, by the timer 21 or else by the timer 23. A transistor 35 is switched by the timer 18 for supplying power to the electromagnet 8 in order to start the running of the leader screen 3, and a transistor 39 is switched thereon by an output of the OR gate 27 for supplying power to the electromagnet 6 in order to start the running of the follower screen 2. A constant voltage diode to 31 supplies reference voltage for detection to comparators 29 and 30 for detection of a power source voltage, and resistors 32 and 34 produce two kinds of reference voltages different from each other corresponding to the power source voltages which have been lowered by a predetermined ratio and give the same to each of the comparators 29 and 30.

Next, an operation of the embodiment having the above-mentioned arrangement shall be explained for two separate cases, that is, the time of a bulb release and the time of releases other than the bulb release.

First, with reference to releases other than a bulb release; the bulb switch 13 at this time is placed in the ON state and the photo-sensing-exposure control circuit 14 and the programmable timer 22 carry out their respective normal operations.

First, as a shutter release button (not shown in the drawing) is pressed to start a release operation, the release switch 12 is turned ON in association with the shutter release button (not shown), and as a result of this the photo-sensing-exposure control circuit 14 functions to carry out a photo-sensing operation for the purpose of giving an aperture value to an aperture control part (not shown in the drawing) and a counting time, corresponding to the shutter release time, to the programmable timer 22. The photo-sensing-exposure control circuit 14 is to have the timer 15 start counting as these operations are completed. The timer 15 is to make a power supply check just before the release and gives "1" to the OR gates 27 and 28 for simultaneously supplying power to the electromagnet 7 in order to start the running of the leader screen 3 and to the electromagnet 6 in order to start the running of the follower screen 2, for a predetermined length of time. By this, the OR gates 27 and 28 are to place the transistors 39 and 37, respectively in the ON state for supplying power to the electromagnets 6 and 7.

And during a period of time from the moment just before the completion of the power supply until the completion thereof "1" is given to the AND gate 16, and the AND gate 16 gives an output of the comparator 29 as a timing start signal to the timer 17 at that time.

The comparator 29 compares a reference voltage Vc given by the constant voltage diode 31 with a voltage $V_{DD}(R_{33}+R_{34})/(R_{32}+R_{33}+R_{34})$ obtained by dividing the power source voltage $V_{DD}$ by the resistors 32 to 34. The resistors 32 to 34 have their resistance values $R_{32}$ and $R_{33}+R_{34}$ set so that a minimum operating voltage Vmin which guarantees a release (both the leader screen running start electromagnet 7 and the follower screen running start electromagnet 8 can function even when power is suplied simultaneously thereto) and the reference voltage Vc will have a relationship of $$Vc = \frac{R_{33} + R_{34}}{R_{32} + R_{33} + R_{34}} V\text{min}$$

and when the relation is such that the power source voltage $V_{DD}$>the minimum operating voltage Vmin, the output of the comparator 29 becomes "1" and only when both electromagnets 6 and 7 can simultaneously operate the timer 17, will the operation start.

Also at this time as power is supplied respectively to the leader screen running start electromagnet 7 and the follower screen running start electromagnet 6, the leader screen 3 and the follower screen 2 are released, but since they are retained by the clamp member 10 as shown in FIG. 1, they do not start running.

Now, when the result of the above-mentioned checking of the voltage of power being supplied is, $V_{DD}$>Vmin and it is judged that a release can be made, the timer 17 starts a time counting from an output of the AND gate 16.

The leader screen 3 and the follower screen 2, released by the leader screen running start electromagnet 7 and the follower screen running start electromagnet 6 at the time when the voltage of power being supplied by the start of operation of the timer 17 is checked, secure a period of time such that they are bound respectively by the electromagnets 7 and 6 again, as the outputs of the OR gates 27 and 28 become "0", and the timer 17 after respectively counting a sufficient length of time actuates the timer 18. The timer 18 places the transistor 35 ON for a length of time which is needed to sufficiently actuate the electromagnet 8 for having the electromagnet 8 function, and then after that gives "1" to the AND gate 19. By this, the electromagnet 8 releases the clamp member 10 and the clamp member 10 swingingly operates by a contraction force of the spring 9 for releasing the retention of the leader screen 3 and the follower screen 2 and at the same time releasing the retention of the mirror (not shown in the drawing), thus making the mirror move up. When the mirror reaches the mirror-up completion position the mirror-up switch 20 comes ON, the AND gate 19 receives the signal therefrom and the time counting completion signal of the timer 18 then gives its output as an operation start signal to the timers 21 to 23. The timer 21 gives "1" to the OR gate 28 for a length of time which is sufficient for the leader screen running start electromagnet 7 to function. By this, the OR gate 28 places the transistor 37 in ON state and supplies power to the electromagnet 7. Therefore, the leader screen running start electromagnet 7 releases the leader screen 3, then the leader screen 3 runs by the contraction force of the spring 5 since the retention thereof by the clamp member 10 has also been released.

The programmable timer 22 counts a length of time set by the photo-sensing-exposure control circuit 14 and gives "1" to the OR gate 25 at the same time the time counting thereof is completed for having the follower screen 2 run.

The timer 23 also starts a time counting at the same time the programmable timer 22 starts the time counting and upon the lapse of a predetermined length of time gives "1" to the OR gate 28 for a prescribed length of time for checking a voltage of power being supplied, then the OR gate 28 places thereby the transistor 37 ON for supplying power to the leader screen running start electromagnet 7. The leader screen 3 is already running at this time, thus mechanically no action at all will be made. And "1" is given to the AND gate 24 for a period of time from a moment just before the completion of power supply until the completion thereof and the output of the comparator 30 during this period of time is given to the programmable timer 22 and the OR gate 25. The reference voltage Vc by the constant voltage diode 31 and the voltage $V_{DD}·R_{34}/(R_{32}+R_{33}+R_{34})$ obtained by dividing the power source voltage $V_{DD}$ by the resistors 32 to 34 have been given to the comparator 30, and the comparator 30 gives a result of a comparison of these voltages to the AND gate 24. The resistors 32 to 34 have their resistance values $R_{32}+R_{33}$ and $R_{34}$ so set that the minimum operating voltage V'min only allows the follower screen running start electromagnet 6 to sufficiently function and the reference voltage Vc has a relationship of:

$$Vc = \frac{R_{34}}{R_{32} + R_{33} + R_{34}} V'\text{min}$$

And at a time in the relationship when the power source voltage $V_{DD}\geq$ the minimum operating voltage V'min is satisfied, the output of the comparator 30 becomes "1". Therefore, when the power source voltage at the time power is supplied to the leader screen 3 reaches a limit to allow the follower screen 2 to run, the AND gate 24 will have an output "1" and supplies a signal which forcibly terminates the release to the OR gate 25 and the programmable timer 22. The timer 23 repeatedly time counts and checks the voltage of power being supplied until the programmable timer 22 completes the time counting, and the OR gate 25 receives the output of the AND gate 24 as a result of the checking of voltage of power being supplied or the time counting completion signal by the programmable timer 22 and actuates the timer 26. The timer 26 places the transistor 39 ON through the OR gate 27 for a length of time which allows the follower screen running start electromagnet 6 to sufficiently function for supplying power to the electromagnet 6. At this time, since the follower screen 2 has been released from the follower screen running start electromagnet 6 and has also already been released from the clamp member 10, the screen 2 runs by the contraction force of the spring 4, thus completing the release.

Also, the leader screen 3, the follower screen 2, and the clamp member 10 are, upon completion of the release, returned to their positions before the release in association with a film wind up, thus resuming the condition prior to the release.

Next, concerning the time of a bulb release, the bulb switch 13 is OFF at this time and the photo-sensing-exposure control circuit 14 does not accomplish photo-sensing and exposure control, and when the release switch 12 comes ON, the timer 15 is immediately actuated and a voltage check by the comparator 29 is made when power is supplied to the leader screen running start electromagnet 7 and the follower screen running start electromagnet 6 in the same manner as in the above-mentioned state wherein the bulb switch 13 is ON. When the output of the comparator 29 is "1" that is in a relationship where the power source voltage $V_{DD}\geq$ the minimum operating voltage Vmin is satisfied as detected by the checking of voltage of power being supplied mentioned above, the output of the AND gate 16 reaches "1" and the timer 17 is actuated, then the leader screen and the follower screen running start electromagnets 7, 6 are placed in an attracted state again for attracting and retaining the leader screen 3 and the follower screen 2. And the electromagnet 8 releases the clamp member 10 by operation of the timer 18, and the forcible retention of the leader screen 3 and the follower screen 2 is released and at the same time the mirror goes up. At the same time, with a mirror up completion, an operation start signal is produced from the AND gate 19 to the timers 21 to 23, then the timer 21 supplies power to the leader screen running start electromagnet 7 for running the leader screen 3. Here the programmable timer 22 will not time count since the bulb switch 13 is OFF. On the other hand, after the lapse of a predetermined length of time, the timer 23 gives "1" to the OR gate 28 for a prescribed period of time for making a checking of voltage in the power being supplied, and the OR gate 28 thereby places the transistor 37 ON for supplying power to the leader screen running start electromagnet 7, thus giving "1" to the AND gate 24 for a period of time from a moment just before the completion of power supply till the completion, and the output of the comparator 30 during that period of time is given to the OR gate 25. This comparator 30 has an output of "1" when the minimum operating voltage V'min, which allows only the follower screen running start electromagnet 6 to function sufficiently, has a relationship of the power source voltage $V_{DD} \leq$ the minimum operating voltage V'min, and at a time being reverse thereto that is under the condition in which the electromagnet 6 can function sufficiently and produces "0". Therefore, when the power source voltage $V_{DD}$ has dropped down to such level as to be unable to sufficiently operate the follower screen running start electromagnet 6, power is supplied forcibly to the electromagnet 6 by the output "1" from the AND gate 24 for running the follower screen 2, and on the other hand, when the power source voltage $V_{DD}$ is at a sufficiently high level, the operation of the timer 23 is continued as long as the release switch 12 is not OFF, thus checking voltage by several intermittent power supplies to the leader screen running start electromagnet 7 with every set time interval. Also, by placing the release switch 13 in the OFF state the signal "1" is supplied forcibly to the OR gate and thereby supplying power to the follower screen running start electromagnet 6 for running the follower screen 2.

Also in the above described embodiment, while the timing of checking the voltage of power being supplied by the timing of output "1" to the AND gates 16 and 24 of the timers 15 and 23 is set during a period of time from a moment just before the completion of power supply to each electromagnet 6 and 7 till the completion, as an example, the checking of the voltage at a time just upon completion of the power supply results in a correct check of the voltage.

The characterizing feature in the above-mentioned embodiment lies principally in that checking of the power source voltage $V_{DD}$ is done intermittently after the running of the leader screen 3 even at a time of a long time release or a bulb release, and by such an operation even in a case when it cannot be judged as to how long the shutter is opened after the leader screen 3 runs especially as in a bulb release, a check of the most up-to-date power source voltage value $V_{DD}$ can be accomplished. Furthermore, the checking of the power source voltage value $V_{DD}$ will be done in a manner making a very exact confirmation while supplying power to the leader screen running start electromagnet 7 which has an electric load equivalent to that of the follower screen running start electrode 6. Also, since the checking of voltage of power being supplied by the power source voltage $V_{DD}$ is done intermittently by the timer 23, such a great effect can be obtained with exact voltage checkings that power consumption can be held to the lowest possible level.

Also, in the above embodiment, the checkings of the voltage of the power source voltage $V_{DD}$ are done when that power is supplied to both the leader screen and follower screen running start electrodes 7 and 6, even before the running of the leader screen 3 in a release action, and an appropriate voltage checking can be made even under other ordinary photo-taking states in which the leader screen 3 and the follower screen 2 run almost at the same time other than a time of longer release or a bulb release.

Also, in the above embodiment, the checking of voltage after the leader screen 3 runs is set by judging the minimum operating voltage V'min which allows only the follower screen running start electromagnet 6 to function, and on the other hand, the checking just before the release action is set by judging the minimum operating voltage Vmin which allows both the leader screen running start electrode 7 and the follower screen running start electrode 6 to function simultaneously, thus always appropriate checkings of the power source voltage $V_{DD}$ can be made.

Further, in the above-mentioned embodiment, since the running of the follower screen 2 is made forcibly by supplying power to the follower screen running start electromagnet 6 when the relationship, the power source voltage $V_{DD} \leq$ the minimum operating voltage V'min exists in an intermittent voltage check after the leader screen 3 runs as mentioned above, the shutter will not be left open by a drop in the power source voltage $V_{DD}$, thus an incidence of irregular light ruining an entire roll of film since the shutter is left opened, which has been a problem in a conventional device, can be prevented.

As has been explained above, the present invention is characterized by a voltage detecting device for a camera in which a power source voltage is intermittently checked during a period of time after the leader screen 3 of a shutter runs until a moment before a follower screen of the shutter runs. Therefore, the present invention can provide a voltage detecting device for a camera in which the most up to date power source voltage value can always be obtained taking into consideration a voltage drop in the power supply of an electric load even at a time of longer release or at time of a bulb release, and an exact judgement as to whether a release action can be made or not irrespective of the length of the shutter time can be made, and at the same time, the virtual life of the battery can be extended compared to that in a conventional system.

What is claimed is:

1. A voltage detecting device for a camera, comprising:
    (a) shutter control means for controlling the start of the running of a follower screen of a shutter by control of the power supply to an electromagnetic member;
    (b) a voltage detecting circuit for detecting the voltage level of a power source voltage, said circuit performing the detection with connection to an electric load different from said electromagnetic member; and (c) operating means for intermittently detecting the voltage by means of said voltage detecting circuit during a period of time from the start of the running of a leader screen of the shutter until the start of the running of the follower screen.

2. A voltage detecting device according to claim 1, wherein the voltage detecting circuit makes the detection by supplying power to an electric load which is almost equivalent to that of the electromagnetic member.

3. A voltage detecting device according to claim 1, further comprising an electromagnetic member for the leader screen of the shutter for controlling the start of the running of the leader screen.

4. A voltage detecting device according to claim 3, wherein the electromagnetic member for the leader screen of the shutter is used as the electric load.

5. A voltage detecting device according to claim 1, wherein said operating means obtains an intermittent timing operation from a timer circuit.

6. A voltage detecting device according to claim 1, further comprising:
(d) a comparison circuit for comparing whether or not the voltage level detected by the voltage detecting circuit reaches a predetermined voltage level; and
(e) shutter follower screen running means for forcedly running the follower screen of the shutter when the voltage level detected by the voltage detecting circuit is determined by said comparison circuit as not reaching said predetermined voltage level.

7. A voltage detecting device according to claim 6, wherein said shutter follower screen running means forcedly supplies a power supply signal, for starting the running, to the electromagnetic member for the follower screen of the shutter control means.

8. A voltage describing device according to claim 1, further comprising:
(f) second operating means for putting into effect a voltage detection by the voltage detecting circuit just before the leader screen of the shutter starts running.

9. A voltage detecting device according to claim 8, further comprising:
(g) a second comparison circuit for comparing whether or not the voltage level detected by the voltage detecting circuit has reached a predetermined voltage level; and
(h) shutter leader screen running inhibiting means for inhibiting the running of the leader screen of the shutter when the voltage level detected by the voltage detecting circuit is determined by said second comparison circuit as not reaching the predetermined voltage level.

10. A voltage detecting device according to claim 9, wherein the predetermined voltage level for the second comparison circuit is set at a higher level than that of the predetermined voltage level for the first comparison circuit.

11. A voltage detecting device according to claim 9, wherein the predetermined voltage level for the second comparison circuit is set at about the minimum voltage level necessary for the simultaneous running of both the leader screen and the follower screen.

12. A voltage detecting device for a camera, comprising:

(a) shutter control means for controlling the start of the running of a follower screen of a shutter by control of the power supply to an electromagnetic member;
(b) a voltage detecting circuit for detecting the voltage level of a power source voltage, said circuit performing the detection with connection to an electric load different from said electromagnetic member; and
(c) operating means for intermittently detecting the voltage by means of said voltage detecting circuit during a period of time from the start of the running of a leader screen of the shutter until the start of the running of the follower screen;
and wherein the electromagnetic member for the follower screen of the shutter in the shutter control means is of a type which starts said running by supplying power thereto.

13. A voltage detecting device according to claim 12, wherein the voltage detecting circuit makes the detection by supplying power to an electric load which is almost equivalent to that of the electromagnetic member.

14. A voltage detecting device according to claim 12, further comprising an electromagnetic member for the leader screen of the shutter for controlling the start of the running of the leader screen.

15. A voltage detecting device according to claim 14, wherein the electromagnetic member for the leader screen of the shutter is used as the electric load.

16. A voltage detecting device according to claim 12, wherein said operating means obtains an intermittent timing operation from a timer circuit.

17. A voltage detecting device according to claim 12, further comprising:
(a) a comparison circuit for comparing whether or not the voltage level detected by the voltage detecting circuit reaches a predetermined voltage level; and
(b) shutter follower screen running means for forcedly running the follower screen of the shutter when the voltage level detected by the voltage detecting circuit is determined by said comparison circuit as not reaching said predetermined voltage level.

18. A voltage detecting device according to claim 17, wherein said shutter follower screen running means forcedly supplies a power supply signal, for starting the running, to the electromagnetic member for the follower screen of the shutter control means.

19. A voltage detecting device according to claim 14, further comprising second operating means for putting into effect a voltage detection by the voltage detecting circuit just before the leader screen of the shutter starts running.

20. A voltage device according to claim 19, further comprising:
(a) a second comparison circuit for comparing whether or not the voltage level detected by the voltage detecting circuit has reached a predetermined voltage level; and
(b) shutter leader screen running inhibiting means for inhibiting the running of the leader screen of the shutter when the voltage level detected by the voltage detecting circuit is determined by said second comparison circuit as not reaching the predetermined voltage level.

21. A voltage device according to claim 20, wherein the predetermined voltage level for the second comparison circuit is set at a higher level than that of the predetermined voltage level for the first comparison circuit.

22. A voltage device according to claim 20, wherein the predetermined voltage level for the second comparison circuit is set at about the minimum voltage level necessary for the simultaneous running of both the leader screen and the follower screen.

* * * * *